United States Patent [19]

Hochstrasser

[11] Patent Number: 4,963,780

[45] Date of Patent: Oct. 16, 1990

[54] WATER DRIVEN GENERATOR FOR SANITARY DOMESTIC INSTALLATION

[75] Inventor: Ferdinand F. Hochstrasser, Auenstein, Switzerland

[73] Assignee: KWC AG, Switzerland

[21] Appl. No.: 412,096

[22] Filed: Sep. 25, 1989

[30] Foreign Application Priority Data

Sep. 27, 1988 [CH] Switzerland ............ 03580/88

[51] Int. Cl.⁵ .................. H02K 7/18; F01D 15/10
[52] U.S. Cl. ..................... 310/104; 290/52; 310/88; 417/423.11; 4/623
[58] Field of Search ............ 290/52; 310/88, 104, 310/261, 266, 87, 89; 417/410, 423.11; 4/623, DIG. 3

[56] References Cited

U.S. PATENT DOCUMENTS

| | | | |
|---|---|---|---|
| 3,520,642 | 7/1970 | Fulton | 310/104 |
| 4,229,811 | 10/1980 | Salem | 4/623 |
| 4,402,095 | 9/1983 | Pepper | 4/623 |
| 4,520,516 | 6/1985 | Parsons | 4/623 |
| 4,564,339 | 1/1986 | Nakamura et al. | 310/57 |
| 4,740,725 | 4/1988 | Charron | 310/88 |
| 4,752,194 | 6/1988 | Wienen et al. | 417/423.11 |

FOREIGN PATENT DOCUMENTS

| | | | |
|---|---|---|---|
| 830535 | 2/1952 | Fed. Rep. of Germany | 290/52 |
| 1345411 | 5/1974 | United Kingdom | |
| PCT/US84/01481 | 9/1984 | World Int. Prop. O. | |

Primary Examiner—Steven L. Stephan
Assistant Examiner—D. L. Rebsch
Attorney, Agent, or Firm—Barnes & Thornburg

[57] ABSTRACT

The turbine wheel (30) in the flow duct (28) of the water fitting (10) is subjected to water flowing in the flow direction (S). The turbine wheel (30) drives the rotor (64) of the generator (16) via the common shaft (32). The rotor (16) is surrounded by the beaker-shaped sealing element (66) which is fed through the gap between the stator (80) and the rotor (64) and is connected in a leak-tight manner to the casing (12). The rotor (64) therefore rotates within the water-filled sealing element (66).

21 Claims, 1 Drawing Sheet

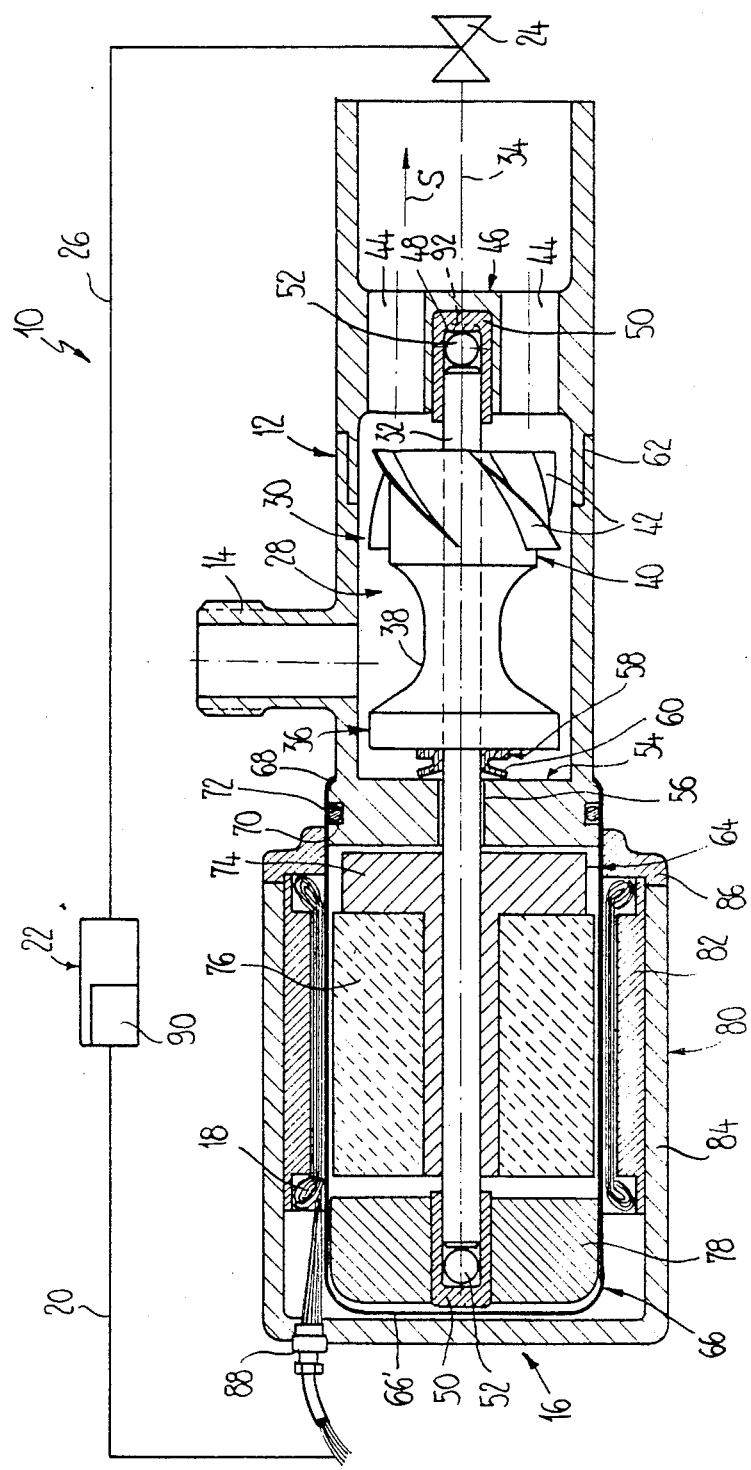

WATER DRIVEN GENERATOR FOR SANITARY DOMESTIC INSTALLATION

BACKGROUND OF THE INVENTION

The present invention concerns a water fitting, particularly for sanitary domestic installations. The present invention particularly concerns such water fittings having a turbine located in a flow duct, an electrical generator driven by the turbine, and a sealing arrangement therefor.

Such a water fitting is, for example, known from the international patent application published under the number WO 85/01337. This reveals a water dispenser whose water flow can be switched on and off by means of an electrically controlled valve. A turbine wheel acted on by the water is located in a flow duct of the water dispenser upstream relative to the valve and this turbine wheel drives a low power electrical generator. The generator is connected to a control arrangement controlling the valve, it being possible to charge the accumulator of this arrangement with the electricity supplied by the generator. The flow duct of the water dispenser has a 90° bend, the turbine wheel being provided upstream of this bend and the axis of rotation of the turbine wheel coinciding with the longitudinal axis of the tubular casing bounding the flow duct in this region. The generator is aligned with the turbine and is provided outside the casing in the region of the 90° bend, an opening being provided in the casing for the passage of the generator shaft coupled to the driven shaft of the turbine wheel.

A hat-shaped sealing element protruding through the opening in the casing into the flow duct is clamped between the generator and the casing of the water fitting. This sealing element has a hole extending in the axial direction for the driven shaft of the turbine wheel or the drive shaft of the generator. Between the inner surface of the sealing element and the drive shaft of the generator, there is an 0-ring seal which, further in the axial direction, is in contact with the inner end surface of the sealing element and, opposite this, with a sealing disk provided on the generator shaft. This sealing arrangement leads to substantial losses relative to the low power of the turbine. In addition, it is subject to wear and aging which can lead to water penetrating into the inner part of the generator.

The object of the present invention is therefore to produce a water fitting, including a turbine and electrical generator whose losses are extremely small and whose sealing arrangement is reliably leak-tight independent of aging.

SUMMARY OF THE INVENTION

This object is achieved by providing a sealing arrangement between the stator and the rotor of the generator made of non-magnetic material, the rotor including a permanent magnet arrangement for excitation of the stator.

The generator rotor is not sealed off from the flow duct but rotates in the water. A sealing element, which is essentially a hollow cylinder and separates the stator from the water, is provided in the gap between the stator and the rotor. It does not, therefore, generate losses and the dynamic seal subject to aging is no longer necessary. On the contrary, the separation between the space filled with water and the stator takes place by means of a static seal. Because the excitation of the generator takes place by means of a permanent magnet arrangement on the rotor, no parts carrying electricity are necessary in the space filled with water. This substantially simplifies the water fitting and increases its reliability.

In a particularly preferred and simple embodiment, the rotor is enclosed by the sealing element in a beaker shape. The sealing arrangement in the generator is therefore designed in one piece and also acts as the bearing for the rotor.

In a particularly simple embodiment, the stator is seated on the sealing element. This avoids an additional holding arrangement for the stator.

Because the rotor rotates in the water, the losses can be minimized by having the rotor formed as a cylindrical permanent magnet.

Calcination of the generator can be prevented by means of a throttle element limiting the replacement of the water present in the rotor region.

In a similarly preferred embodiment, the sealing element is formed by a part of the casing bounding the flow duct. This permits an extremely simple construction of the water fitting and prevents an otherwise necessary deflection of the water.

A particularly preferred water fitting has an electrical control arrangement and an electrically controllable valve arrangement, and is independent of any external electricity source. This substantially simplifies the installation.

In one embodiment, the signal generated by the generator is also used to determine the water flow through the fitting. Given an appropriate design of the control arrangement, this signal makes it possible, in the simplest manner, to produce a mixing fitting which also permits a predetermined water flow for a given mixed water temperature.

An electrical generator is also disclosed of low power, i.e. a few watts, which is particularly suitable for use in water fittings. It can, however, also be used in association with other fluids or gas installations.

The invention is now described in more detail using an illustrative example shown in the accompanying FIGURE.

BRIEF DESCRIPTION OF THE DRAWING

The single FIGURE is a sectional view of a water fitting in accordance with the present invention.

DESCRIPTION OF THE PREFERRED EMBODIMENT

The water fitting 10 has a casing 12 which is substantially a hollow cylinder and is, for example, made of brass, with an inlet connection 14 protruding towards the outside in a radial direction. An electrical generator 16, whose stator winding 18 is connected to an electrical control arrangement 22, as indicated by a line 20, is provided in an extension of the casing 12. Viewed in the flow direction S, an electrically controllable and symbolically represented valve 24 is connected downstream of the casing 12 and this valve 24 is also connected to the control arrangement 22 via the electrical lead 26.

In the region of the inlet connection 14, a turbine wheel 30 is provided within the casing 12 which, of course, encloses the flow duct 28 for the water. The turbine wheel 30 is seated on a shaft 32 so as to he rotationally solid with it, the axis of rotation 34 of the shaft 32 coinciding with the longitudinal axis of the casing 12.

The turbine wheel 30 has a turbine body 36, which is rotationally symmetrical about the axis of rotation 34 and has a concave recess 38 provided in the region of the inlet connection 14 for deflecting the water supplied through the inlet connection 14 into the axial direction. Following the recess 38 in the flow direction S, a cylindrical part 40 is provided on the turbine body 36. Turbine blades 42 are located on this cylindrical part 40 and protrude in the radial direction from its surface. The turbine blades 42 are acted upon by the water flowing in the axial direction S.

The casing 12 has within it and downstream of the turbine body 36 a support partition 46 for the shaft 32. This partition is provided with a plurality of holes 4 extending in the axial direction. A blind hole 48 is provided in the support partition 46 on the side facing towards the turbine body 36 and the axis of this blind hole 48 coincides with the axis of rotation 34. A hat-shaped bearing bush 50 made of plastic is inserted into the blind hole 48 and, within its recess, there is provided a bearing ball 52 on which this end of the shaft 32 is supported in the axial direction. The end region of the shaft 32 is guided in the radial direction by the bearing bush 50.

On the other end of the turbine wheel 30 from the support partition 46, the casing 12 has, at its end, a partition 54 with an axial opening 56 for the shaft 32. An annular seal 58 which is in contact with the turbine body 36 in the axial direction is seated on the shaft 32. On its end facing towards the partition 54, the seal 58 has a thin sealing lip 60 which is in contact with the partition 54.

In the region of the turbine blades 42, the casing 12 is subdivided into two partial casings, as is indicated by the separation line indicated by 62. This permits the assembly of the parts located within the casing 12. After assembly, the two casing parts are joined together along the separation line 62 to form a single casing 12.

Also seated on the shaft 32 is the rotor 64 of the generator 16, which is surrounded by a beaker-shaped sealing element 66. The sealing element 66 consists of a non-magnetic material, for example a deep-drawn austenitic stainless steel. The open end region of the sealing element 66 overlaps the casing 12 in the region of the partition 54 and is fastened to the latter by means of a crimped edge 68. In the region of this overlap, the casing 12 has a groove 70 extending in the peripheral direction and an 0-ring 72 is provided in this groove.

The rotor 64 has rotationally symmetrical support bodies 74, T-shaped in cross-secton, made, for example, of brass or plastic. A hollow cylindrical permanent magnet 76 is seated rotationally solidly on the support body 74 and this permanent magnet is laterally magnetized at the periphery. Such permanent magnets are obtainable, for example, from the Philips company under the name "FERROXDURE."

A bearing element 78 is provided within the beaker-shaped sealing element 66 in the region of its end 66', this support element being, for example, bonded to the sealing element 66. A further bearing bush 50 is inserted in a central hole 80 of the bearing element 78 and there is, again, a further bearing ball 52 provided in it on which this end of the shaft 32 is supported in the axial direction. This end region of the shaft 32 is guided in the radial direction by the bearing bush 50.

The stator 80 with its multi-phase stator winding 18 and the soft iron body 82 is seated on the beaker-shaped sealing element 66 coaxially with the rotor 64. The stator 80 also has a hood 84, for example of plastic, enclosing the soft iron body 82 and the stator winding 18. This hood 84, together with an annular plastic body 86, which is seated tightly on the sealing element 66 on the end of the soft iron body 82 facing towards the casing 12, closes off the generator 16 from the surroundings. The electrical leads of the stator winding 18 are fed through the hood 84 by means of a stuffing box 88. This generator 16 does not require any commutator and this substantially increases its life.

These electrical leads are connected, as is shown diagrammatically by the line 20, to the control arrangement 22. This has a diagrammatically suggested accumulator indicated by 90, it being preferably possible to provide a nickel/cadmium lead or rechargeable lithium accumulator. This accumulator 90 is charged by the electricity supplied by the generator 16, the phase voltages of the generator 16 being rectified in the control arrangement 22. The accumulator 90 supplies the electricity for the complete control arrangement 22 and the valve 24 even if the water flow through the water fitting 10 is interrupted because the valve 24 is closed. Control arrangements 22 of this type are known and are, for example, connected to a proximity sensor in order to open the valve 24 as soon as the proximity sensor receives a signal and to close the valve again, for example after a certain time or after the cessation of the signal received from the proximity sensor.

As soon as the valve 24 is opened, the water begins to flow in the flow direction S so that the turbine wheel 30 begins to rotate. This rotational motion is transmitted by means of the shaft 32 to the rotor 64, which induces alternating voltages in the stator windings 18. The frequency of this alternating voltage is proportional to the rotational speed of the rotor 64. Given appropriate evaluation in the control arrangement 22, this permits the calculation of the water flowing per unit time through the water fitting 10. If the valve 24 is adjustable, it is therefore possible to adjust the flow output of the water fitting 10 to a predetermined value.

The seal 58 does not have to be designed to seal absolutely. It is envisaged that the space surrounded by the beaker-shaped sealing element 66 will be filled with water. The seal 58 does, however, throttle the water flow between this space and the space enclosed by the casing 12 in order to restrict the calcination within the generator 16. The friction losses of the seal 58 are vanishingly small because, with the valve 24 closed and the turbine wheel 30 consequently at rest, the lip 60 is subjected at most to the pressure difference between the dynamic and static pressures of the water. With the valve 24 open and the turbine wheel 30 consequently running, on the other hand, only the dynamic water pressure is present in the flow duct 28 so that the lip 60 is pressed with the force of its own elasticity at most against the partition 54.

So that the bearing bush 50 can better accept the axial forces of the shaft 32, it is conceivable to locate a carbide platelet 92, shown dotted, on the inner end surface of the bearing bush 50, the bearing ball 52 being supported on this platelet.

It is also conceivable that the permanent magnet should be provided directly on the turbine wheel. The casing of the water fitting then consists, at least in the region of the permanent magnet, of a non-magnetic material and is designed in this region as a hollow cylinder, the stator then surrounding the casing in the region of the permanent magnet. In this embodiment, therefore, the turbine wheel also acts as the generator rotor.

The power to be supplied by the generator for the application envisaged is, at the most, a few watts. It is therefore also conceivable to use the generator directly for other purposes, for example as a rotational speed sensor. It is, however, also possible to employ the generator as a motor, for example, to drive a pump of small output.

Instead of one permanent magnet, a plurality of permanent magnets can, of course, be provided for the excitation.

The seal 58 can also be omitted, particularly where the water fitting 10 is used in a region with water of low hardness. It can, however, also be replaced by a filter arrangement which reduces or prevents the penetration of lime into the rotor space.

It is also conceivable that the electrically controllable valve should be connected upstream of the turbine wheel, viewed in the flow direction.

The water fitting can be designed as a mixing fitting, in which case one valve each is provided for the control of the hot and cold water. The mixed water temperature can be measured by means of a temperature sensor in order to regulate the mixed water temperature to a specified value. Additional variations and modifications exist within the scope and spirit of the invertion as described and as defined the following claims.

What is claimed is:

1. A water fitting having a flow duct, having a turbine wheel located in this flow duct and subjected to flowing water, having an electrical generator driven by the turbine wheel, the electrical generator including a rotor and a stator, and having a seal arrangement to seal the flow duct, wherein the seal arrangement has a unitary beaker shaped sealing element (66) fixedly located in the gap between the stator (80) and the rotor (64) of the generator (16), enclosing the rotor and sealing the flow duct (28) off from the stator (80), the sealing element (66) being made from a non-magnetic metal and including a bearing element (78) on an end face (66') thereof, the rotor (64) being rotatably supported by the bearing element and having a permanent magnet arrangement (76) for the excitation of the generator, the stator (80) being seated on the sealing element (66).

2. The water fitting as claimed in claim 1, wherein the generator (16) is connected to an electrical control arrangement (22) which has a storage element (90) including an accumulator, which can be charged by the electricity generated by the generator (16) and wherein a valve arrangement (24) which can be electrically controlled by means of the control arrangement (22) is provided for regulating the water flow.

3. The water fitting as claimed in claim 2, wherein the control arrangement (22) has an evaluation unit in order to determine the water flow from the signal supplied by the generator (16).

4. The water fitting as claimed in claim 1, wherein the rotor (64) and the stator (80) are located coaxially with respect to one another.

5. The water fitting as claimed in claim 1, wherein the rotor (64) is designed in cylindrical shape and the permanent magnet arrangement (76) has a cylindrical permanent magnet.

6. The water fitting as claimed in claim 1 wherein the turbine wheel (30) and the rotor (64) are seated on a common shaft (32) which is rotatably supported, in the region of the end face (66') of the sealing element (66) on on the bearing element (78).

7. The water fitting as claimed in claim 6, further comprising a throttle element (58) including a lip-shaped sealing unit surrounding the shaft (32) and in contact with the casing (12, 54) bounding the flow duct (28) between the turbine wheel (30) and the rotor (64).

8. The water fitting as claimed in claim 1, wherein the casing bounding the flow duct in the region of the permanent magnet arrangement is designed to be a hollow cylinder and consists of a non-magnetic metal and wherein the stator surrounds the casing in the region of the permanent magnet arrangement.

9. The water fitting as claimed in claim 1, wherein the stator (80) has a multi-phase armature winding (18).

10. An electrical generator of low power as claimed in claim 1, wherein a sealing element (66) fixedly located in the gap between the rotor (64) and the stator (80) of the generator (16) is provided in order to seal the stator (80) off from the rotor (64) surrounded by a medium.

11. A water fitting for use in domestic sanitary installation comprising: a flow duct, a turbine wheel located in the flow duct so as to be subjected to water flowing through the duct, an electrical generator driven by the turbine wheel having a stator and a rotor including a permanent magnet arrangement for the excitation of the generator, a gap separating the rotor and stator, and a unitary beaker shaped seal element made from a non-magnetic metal and fixed in the gap between the stator and the rotor, the seal element enclosing the rotor, sealing the flow duct off from the stator, and including a bearing element on an end face thereof rotatably supporting the rotor, the stator being fixed to an outer surface of the beaker shaped seal element to surround the rotor.

12. A water fitting as claimed in claim 11 further comprising a shaft rotatably supported in the bearing element, the rotor and the turbine wheel being fixed to the shaft.

13. A water fitting as claimed in claim 12 further comprising a throttle element surrounding the shaft between the rotor and turbine wheel and in contact with the flow duct for restricting water exchange adjacent to the rotor.

14. A water fitting as claimed in claim 13 wherein the throttle element is rotatably carried by the shaft and includes a radially outwardly projecting lip contacting the flow duct.

15. A water fitting as claimed in claim 14, further comprising an electrical control including a storage element connected to the electric generator and an electrically operated valve connected to the control for regulating the flow of water through the flow duct.

16. A water fitting as claimed in claim 15 wherein the control further comprises an evaluation unit for determining the flow of water through the flow duct from a signal supplied by the generator.

17. A water fitting for sanitary installations having a casing defining a flow duct, a turbine wheel located in this flow duct and subjected to flowing water, an electrical generator located outside the casing comprising a stator and a rotor driven by the turbine wheel, the rotor having a permanent magnet arrangement for the excitation of the generator, a shaft element passing through an opening in the casing connecting the turbine wheel and the rotor, and a seal arrangement for sealing the flow duct, the seal arrangement comprising a beaker-shaped sealing element fixedly located in the gap between the stator and the rotor sealing the flow duct off from the stator, the sealing element being made from non-magnetic metal, and a throttle element seating on the shaft element between the turbine wheel and the rotor, the throttle element having a lip-shaped sealing unit being in contact with the casing around the opening and being pressed in a direction towards the casing by the water in the flow duct.

18. The water fitting of claim 17 wherein the casing defining the flow duct includes a inlet situated transverse to the shaft and outlet coaxially about an end of the shaft opposite the rotor so that water flowing through the duct from the inlet to the outlet causes an axial thrust on the turbine wheel and shaft away from the throttle element.

19. The water fitting of claim 17 wherein the seal element is beaker shaped with one end being fixed to the casing, the seal element enclosing the rotor and including a bearing element rotatably supporting an end of the shaft element.

20. The water fitting of claim 17 further comprising an electrical control including a storage element connected to the electric generator and an electrically operated valve connected to the control for regulating the flow of water through the flow duct.

21. A water fitting as claimed in claim 20 wherein the control further comprises an evaluation unit for determining the flow of water through the flow duct from a signal supplied by the generator.

* * * * *